(12) United States Patent
Jang et al.

(10) Patent No.: US 9,674,501 B2
(45) Date of Patent: Jun. 6, 2017

(54) TERMINAL FOR INCREASING VISUAL COMFORT SENSATION OF 3D OBJECT AND CONTROL METHOD THEREOF

(75) Inventors: Hyungseok Jang, Busan (KR); Sangjo Park, Gunpo-Si (KR); Dongyoung Lee, Anyang-Si (KR); Soonbo Han, Seoul (KR); Donghyun Kang, Seoul (KR); Hyojin Song, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 14/406,709

(22) PCT Filed: Jul. 6, 2012

(86) PCT No.: PCT/KR2012/005389
§ 371 (c)(1),
(2), (4) Date: Dec. 9, 2014

(87) PCT Pub. No.: WO2014/007414
PCT Pub. Date: Jan. 9, 2014

(65) Prior Publication Data
US 2015/0156472 A1    Jun. 4, 2015

(51) Int. Cl.
*H04N 13/00*    (2006.01)
(52) U.S. Cl.
CPC .............. *H04N 13/0022* (2013.01)
(58) Field of Classification Search
CPC ............ A61F 13/00; A61F 13/00017; A61F 13/00029; A61F 13/00034; A61F 13/00038; A61F 13/00059; A61F 13/00068; A61F 13/0209; A61F 13/0216; A61F 13/022; A61F 13/0223; A61F 13/0243; A61F 13/0289; A61F 15/008; A61F 2013/00131

(Continued)

(56) References Cited

U.S. PATENT DOCUMENTS

2006/0238543 A1 * 10/2006 Fukao ................ H04N 1/6058
345/593
2007/0047040 A1 * 3/2007 Ha ..................... G02B 27/2278
359/24

(Continued)

FOREIGN PATENT DOCUMENTS

JP      2011-259045 A    12/2011
KR    2001-0001341 A      1/2001

(Continued)

OTHER PUBLICATIONS

Mangiat et al, Displaying Remapping for Hanheld 3D Video Communications, 2012.*

(Continued)

*Primary Examiner* — Shan Elahi
(74) *Attorney, Agent, or Firm* — Birch, Stewart, Kolasch & Birch, LLP

(57) ABSTRACT

Disclosed are a terminal for increasing visual comfort sensation of a 3D object and a control method thereof. To this end, a control method of a terminal includes displaying the 3D content on a screen of the terminal. When a specific 3D object included in the 3D content moves in a specific direction on the screen, a rendering scheme of the specific 3D object is changed. The specific 3D object is displayed on the screen using the changed rendering scheme.

16 Claims, 10 Drawing Sheets

(58) Field of Classification Search
USPC .......................................................... 348/51
See application file for complete search history.

(56) References Cited

U.S. PATENT DOCUMENTS

| | | | | |
|---|---|---|---|---|
| 2007/0070066 | A1* | 3/2007 | Bakhash | G06F 3/04815 345/419 |
| 2008/0007559 | A1* | 1/2008 | Kalaiah | H04N 13/0275 345/501 |
| 2008/0028341 | A1* | 1/2008 | Szeliski | G06F 3/04815 715/854 |
| 2008/0126021 | A1* | 5/2008 | Hoguet | G06F 17/5004 703/1 |
| 2009/0240654 | A1* | 9/2009 | Limber | G06F 8/35 |
| 2011/0025825 | A1* | 2/2011 | McNamer | H04N 13/0221 348/46 |
| 2011/0063410 | A1* | 3/2011 | Robert | H04N 13/0066 348/42 |
| 2011/0161843 | A1* | 6/2011 | Bennett | G06F 3/14 715/760 |
| 2011/0193945 | A1 | 8/2011 | Tsuchida | |
| 2011/0255775 | A1* | 10/2011 | McNamer | G06T 7/0075 382/154 |
| 2012/0081520 | A1 | 4/2012 | Lee et al. | |
| 2012/0148147 | A1 | 6/2012 | Ogata et al. | |
| 2012/0154517 | A1* | 6/2012 | Um | H04N 13/02 348/14.16 |
| 2013/0024764 | A1* | 1/2013 | Lou | G06T 19/00 715/234 |
| 2013/0135435 | A1* | 5/2013 | D'Amato | H04N 13/0022 348/43 |
| 2013/0155053 | A1* | 6/2013 | Beck | G09G 5/006 345/419 |
| 2015/0082181 | A1* | 3/2015 | Ames | G06F 3/04815 715/738 |

FOREIGN PATENT DOCUMENTS

| | | |
|---|---|---|
| KR | 10-2010-0036015 A | 4/2010 |
| KR | 10-2011-0028232 A | 3/2011 |
| KR | 10-2011-0091443 A | 8/2011 |
| KR | 10-2012-0035071 A | 4/2012 |
| KR | 10-2012-0069799 A | 6/2012 |

OTHER PUBLICATIONS

Sarakoglou et al, Free to Touch: A Portable Tactile Display for 3D Surface Texture Exploration, 2006.*
Altinay et al, Stereoscopic Output and Novel Interaction Concepts for the IAVAS 13D Player, 2008Onatra.*
Onatra et al, Evaluation of 3D application on mobile gaming consoles using Client-Server architecture, 2010.*

* cited by examiner (a)

(b)

(a)

(b)

ND CONTROL METHOD THEREOF

BACKGROUND OF THE INVENTION

Field of the Invention

The present disclosure relates to a terminal for increasing visual comfort sensation of a 3D object and a control method thereof.

Description of the Related Art

Most stereoscopic images and image displays use properties of binocular disparity. In a method of obtaining a stereoscopic image, a real image is mainly implemented using a stereo camera having two incident lenses. The operation of a 3D computer graphic (CG) used in an existing 2D-display is performed using a virtual camera in the same principle as a real camera. On the other hand, a 3D image may be produced by forming images using two or more virtual cameras and synthesizing the images output from the respective cameras to be compatible with the structure of a 3D-display. Alternatively, a 3D picture (or image) or graphic object (or 3D object) may be produced by synthesizing existing two or more pictures (or images).

When left and right eye images displayed on a display screen are divided and input to person's left and right eyes, respectively, the person may perceive as if an object was floated at the position of a perceived 3D image.

In this case, the distance between both the person's eyes and the perceived 3D image is referred to as a convergence distance. The convergence distance is in inverse proportion to a disparity between the left and right eye images displayed on the display screen. Accordingly, in a 3D stereoscopic image (particularly, a stereo 3D image), disparities between objects in images corresponding to the respective left and right eyes are controlled, thereby controlling the sensation of depth of objects.

However, in most stereoscopic images currently developed, the disparity is fixed, and hence an appropriate convergence distance is determined. If a person watches a stereoscopic image display at a position out of the appropriate convergence distance, the person may have some visual inconvenience.

SUMMARY OF THE INVENTION

Therefore, an object of the present disclosure is to provide a terminal for increasing visual comfort sensation of a 3D object and a control method thereof.

To achieve these and other advantages and in accordance with the purpose of the present disclosure, as embodied and broadly described herein, there is provided a control method of a terminal providing a 3D content, the method including: displaying the 3D content on a screen of the terminal; changing a rendering scheme of a specific 3D object included in the 3D content when the specific 3D object moves in a specific direction on the screen; and displaying the specific 3D object on the screen using the changed rendering scheme.

The 3D content may be a 3D web-page.

The specific direction may be a direction facing an edge on the screen from a previous position of the specific 3D object movement.

The changing of the rendering scheme may be performed by changing the image depth of the specific 3D object based on a position of the specific 3D object on the screen.

The image depth may be decreased when the position of the specific 3D object on the screen approaches the edge on the screen.

The changing of the rendering scheme may include determining whether or not the specific 3D object is out of a reference area based on the movement of the specific 3D object; and changing the rendering scheme when the specific 3D object is out of the reference area.

The reference area may be determined based on a degree of visual fatigue of a user of the terminal.

The rendering scheme may be a scheme in which a 3D effect is implemented based on first and second images included in the specific 3D object, and the image centers of the first and second images may be positioned on the screen while being spaced apart from each other at a distance corresponding to the image depth of the specific 3D object.

The image center of the first image may be closer to the edge on the screen than that of the second image.

The changing of the rendering scheme may include determining whether or not a portion of the first image is out of the screen due to the movement of the specific 3D object; and changing the rendering scheme of the specific 3D object when the portion is out of the screen.

The changing of the rendering scheme may be performed by decreasing the image depth of the specific 3D object.

The portion may be positioned on the screen based on the decrease in the image depth.

The changing of the rendering scheme may be performed by not displaying a portion of the second image, corresponding to the portion of the first image.

To achieve the above aspect of the present disclosure, there is provided a terminal, including: a display unit configured to display a 3D content on a screen of the terminal; and a control unit configured to change a rendering scheme of a specific 3D object included in the 3D content when the specific 3D object moves in a specific direction on the screen, and control the display unit so that the specific 3D object is displayed on the screen using the changed rendering scheme.

The specific direction may be a direction facing an edge on the screen from a previous position of the specific 3D object movement.

The rendering scheme may be changed by changing the image depth of the specific 3D object based on the position of the specific 3D object on the screen.

The rendering scheme may be a scheme in which a 3D effect is implemented based on first and second images included in the specific 3D object, and the image centers of the first and second images may be positioned on the screen while being spaced apart from each other at a distance corresponding to the image depth of the specific 3D object.

The rendering scheme may be changed when a portion of the first image is out of the screen due to the movement of the specific 3D object.

The rendering scheme may be changed by decreasing the image depth of the specific 3D object.

The rendering scheme may be changed by not displaying a portion of the second image, corresponding to the portion of the first image.

According to an embodiment of the present disclosure, it is possible to provide a terminal for increasing visual comfort sensation of a 3D object and a control method thereof.

According to the terminal and the control method thereof, when a 3D object moves on a screen of the terminal, the terminal changes a rendering scheme of the 3D object based on the position of the 3D object moving on the screen, so that it is possible to visual comfort sensation of the 3D object.

DETAILED DESCRIPTION OF THE EMBODIMENTS

Figure 1:
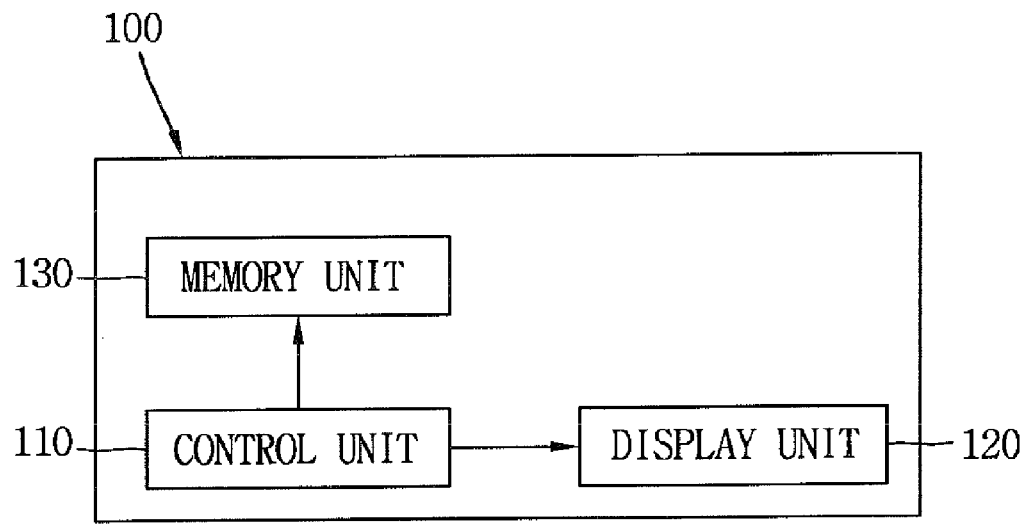
FIG. 1 is a block diagram illustrating a configuration of a terminal according to embodiments of the present disclosure.

The technology disclosed in this specification may be applied to terminals providing 3D contents. However, the technology disclosed in this specification is not limited thereto, and may be applied to all image display devices, multimedia devices, equipments and control methods thereof, to which the spirit of the technology can be applied.

For example, the technology disclosed in this specification may be applied to various terminals such as a smart phone, a portable terminal, a mobile terminal, a personal digital assistant (PDA), a portable multimedia player (PMP) terminal, a notebook computer, a Wibro terminal, an Internet protocol television (IPTV) terminal, a terminal for digital broadcasting, a telematics terminal, a navigation terminal, an audio video navigation (AVN) terminal, a television, a 3D television, an audio/video (A/V) system, a home theater system, an information providing center and a call center.

The 3D contents may include various 3D (or three-dimensional) images (or stereoscopic images) or 3D objects, which generate 3D effects.

Specifically, a 3-dimensional (3D) stereoscopic image will be described. Generally, the 3-dimensional stereoscopic image (hereinafter, referred to as the 3D image).

The 3D image may be implemented using binocular disparity. The binocular disparity refers to a parallax obtained by the positions of user's two eyes away from each other. Therefore, when the two eyes see mutually different 2D images and the images are transferred to the brain through retinas and merged, the user may feel the depth and reality of a 3D image.

The 3D image may be displayed using display methods including a stereoscopic method (glass method), an auto-stereoscopic method (glassless method), a projection method (holographic method), etc. The stereoscopic method is frequently used for home television receivers, etc. and includes a Wheatstone stereoscopic method, etc. The auto-stereoscopic method is frequently used for mobile terminals, etc. and includes a parallax barrier method, a lenticular method, etc. The projection method includes a reflective holographic method, a transmission type holographic method, etc.

Specifically, the generation and display of a 3D image will be described. Generally, a 3D image includes a left image (left eye image) and a right image (right eye image). The method of merging the left and right images into the 3D image may be classified into a top-down scheme in which the left and right images are disposed up and down in one frame, an L-to-R (left-to-right, side by side) scheme in which the left and right images are disposed left and right in one frame, a checker board scheme in which fragments of the left and right images are disposed in a tile form, an interlaced scheme in which the left and right images are alternately disposed by the column or by the row, a time division (time sequential, frame by frame) scheme in which the left and right images are alternately displayed by the time, etc.

The reason of the generation of the 3D effect for a 3D image or 3D object is that a depth (or depth value) in the 3D image or 3D object exists.

The depth may also be called as disparity.

Specifically, the depth (or depth value) in the 3D image will be described. The depth (or depth value) in the 3D image refers to an indicator indicating the 3D distance between objects within an image. The depth is defined as 256 levels (a maximum value is 255 and a minimum value is 0), and a higher value represents a position closer to a viewer or a user. Therefore, the adjustment of a depth in a 3D image means that the depth of the 3D image is adjusted to its original depth when the 3D image is displayed in an original size and the depth of the 3D image is adjusted to a lower depth than the original depth when a content of the 3D image is displayed as a small image.

For example, in case where the maximum value is 255 and the minimum value is 0 under the assumption that the depth is defined as 256 levels, in the method of controlling the image depth according to the one exemplary embodiment, the depth of a 3D image is adjusted to 255 when the 3D image is displayed in its original size, and the depth of the 3D image is adjusted to a smaller value than 255 when the 3D image is displayed in a smaller size than its original size.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

The terminology used herein is for the purpose of describing particular embodiments only and is not intended to be limiting of the invention. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present disclosure.

In the drawings, the thickness of layers, films and regions are exaggerated for clarity. Like numerals refer to like elements throughout.

Reference will now be made in detail to the preferred embodiments of the present disclosure, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents.

Description will now be given in detail of a terminal for increasing visual comfort sensation of a 3D object and a control method thereof according to an embodiment, with reference to the accompanying drawings.

Description of Terminal According to Embodiments of the Present Disclosure

A terminal according to the embodiments of the present disclosure may include a display unit displaying a 3D content on a screen thereof, and a control unit controlling the display unit to change a rendering scheme of a specific 3D object and display the specific 3D object on the screen using the changed rendering scheme, when the specific 3D object included in the 3D content moves in a specific direction on the screen.

FIG. 1 is a block diagram illustrating a configuration of a terminal according to embodiments of the present disclosure.

Referring to FIG. 1, the terminal 100 according to the embodiments of the present disclosure may include a control unit 110 and a display unit 120.

According to an embodiment, the terminal 100 may further include a memory unit 130 storing a variety of information used to increase visual comfort sensation of a 3D object.

In addition, the terminal 100 may further include various components for increasing the visual comfort sensation of the 3D object.

The components shown in FIG. 1 are not essential, and therefore, the terminal 100 may be implemented to have a larger number of components or to have a smaller number of components.

Hereinafter, the components will be sequentially described.

The control unit 110 may perform various functions for providing a function of increasing visual comfort sensation of a 3D object.

Basically, the control unit 110 may function to control the components of the terminal 100 so as to increase the visual comfort sensation of the 3D object.

The control unit 110 may determine that a specific 3D object included in a 3D content displayed on a screen of the terminal 100 moves in a specific direction on the screen.

According to an embodiment, the specific direction may be a direction facing an edge on the screen from a previous position of the specific 3D object movement.

When the specific 3D object moves in the specific direction, the control unit 110 may change a rendering scheme of the specific 3D object.

According to an embodiment, the rendering scheme is a scheme in which a 3D effect is implemented based on first and second images included in the specific 3D object. The image centers of the first and second images may be positioned on the screen by being spaced apart from each other by a distance corresponding to the image depth of the specific 3D object.

For example, the first and second images may be, respectively, left and right images (e.g., left-eye and right-eye images) of the 3D object, which generate the 3D effect.

According to an embodiment, the rendering scheme may be changed by changing the image depth of the specific 3D object based on the position of the specific object on the screen.

For example, the rendering scheme may be changed by decreasing the image depth of the specific 3D object when the specific 3D object approaches the edge on the screen.

The control unit 110 may control the display unit 120 so that the specific 3D object is displayed on the screen using the changed rendering scheme.

The display unit 120 may function to display (or output) information processed in the terminal 100. The information may be displayed or output on a specific screen.

When the terminal 100 performs a specific function, the display unit 120 may display a user interface (UI) or graphic user interface (GUI) related to the specific function.

According to an embodiment, the display unit 120 may display the 3D content provided by the terminal 100. The display unit 120 may display various graphic objects such as 3D images and 3D objects included in the 3D content.

The display unit 120 may include at least one of a display unit 141 and a sound output unit 142. The display unit 141 may include at least one of a liquid crystal display (LCD), a thin film transistor-liquid crystal display (TFT LCD), an organic light-emitting diode (OLED), a flexible display, a 3D display and an electronic-ink (e-ink) display.

Some of the displays may be configured as transparent or light-transmissive displays through which a user can see an outside view. These displays may be called as transparent displays, and a transparent OLED (TOLED), etc. may be used as a representative of the transparent displays. The rear structure of the display unit 120 may also be configured as a light-transmissive structure. Through such a structure, the user can see an object positioned at the rear of a body of the terminal 100 through an area occupied by the display unit 120 of the body of the terminal 100.

Various kinds of information may be displayed in the display unit 120. The information may be displayed in the form of a character, number, symbol, graphic, icon, etc., and may be implemented as a 3D stereoscopic image.

The display unit 120 may be operated as the entire area or may be operated by being divided into a plurality of areas. In case of the latter, the plurality of areas may be configured to operate in relation to one another.

For example, output or input windows may be displayed at upper and lower portions of the display unit 120, respectively. Each of the input and output windows may be an area assigned for the output or input of information. Soft keys on which numbers for inputting a telephone number, etc. are displayed may be output on the input window. If a soft key is touched, a number, etc. corresponding to the touched soft key is displayed on the output window. If a manipulating unit is operated, an attempt to connect a call for a telephone number displayed on the output window may be made, or a text displayed on the output window may be input to an application.

The display unit 120 may be configured to receive a touch input by scrolling the display unit 120. The user may move a cursor or pointer positioned on an object, e.g., an icon, etc. displayed on the display unit 120 by scrolling the display unit 120. Further, when a user's finger is moved on the display unit 120, the path along which the user's finger is moved may be visually displayed on the display unit 120. This may be useful in editing images displayed on the display unit 120.

The display unit 120 may include a touch screen. For example, one function of the terminal 100 may be performed, corresponding to a case in which the touch screen of the display unit 120 is touched together with the display unit 120 within a certain range of time. The case in which the touch screen is touched together with the display unit In addition to the case may include a case in which the user clamps the body of the terminal 100 using user's thumb and forefinger. The one function may be, for example, activation or non-activation for the display unit 120.

The memory unit 130 may function to store information processed in the terminal 100.

According to an embodiment, the memory unit 130 may function to store a 3D content provided by the terminal 100. Specifically, the memory unit 130 may store a 3D image or 3D object included in the 3D content and store depth information on the 3D image or 3D object, etc. When the 3D image or 3D object is processed by the control unit 110, the memory unit 130 may store the processed result.

The memory unit 130 may store various UIs and/or GUIs related to functions performed by the terminal 100.

The memory unit 130 may store data and programs necessary for the operation of the terminal 100.

The memory unit 130 may include a storage medium of at least one of a flash memory type, a hard disk type, a multimedia card micro type, a card type memory (e.g., an SD or XD memory, etc.), a random access memory (RAM), a static random access memory (SRAM), a read-only memory (ROM), an electrically erasable programmable read-only memory (EEPROM) and a programmable read-only memory (PROM). The terminal 100 may operate a web storage performing a storage function of the memory unit 130 on the Internet or may operate in relation to the web storage.

Control Method of Terminal According to Embodiments of the Present Disclosure

A control method of a terminal providing a 3D content according to embodiments of the present disclosure may include displaying the 3D content on a screen of the terminal, changing a rendering scheme of a specific 3D object included in the 3D content when the specific object moves in a specific direction on the screen, and displaying the specific 3D object on the screen using the changed rendering scheme.

Figure 2:
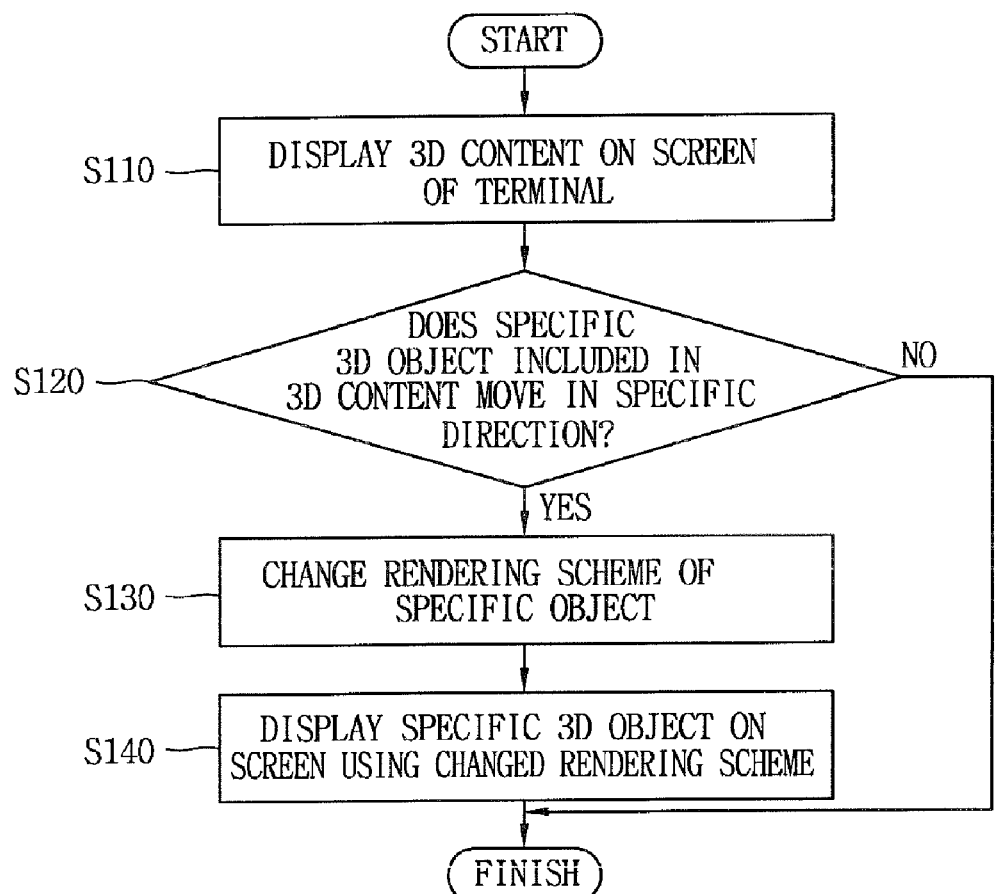
FIG. 2 is a flowchart illustrating a control method of a terminal according to embodiments of the present disclosure.

FIG. 2 is a flowchart illustrating a control method of a terminal according to embodiments of the present disclosure.

Referring to FIG. 2, the control method of the terminal according to the embodiments of the present disclosure may include the following steps.

First, the terminal according to the embodiments of the present disclosure displays a 3D content on a screen thereof (S110).

Next, the terminal determines that a specific 3D object included in the 3D content moves in a specific direction on the screen (S120).

Next, when the specific 3D object moves in a specific direction, the terminal changes a rendering scheme of the specific 3D object (S130).

Next, the terminal displays the specific 3D object on the screen using the changed rendering scheme (S140).

When the specific object does not move or is displayed on the screen using the changed rendering scheme, the control method of the terminal according to the embodiments of the present disclosure is finished.

As described above, the specific direction may be a direction facing an edge on the screen from a previous position of the specific 3D object movement.

Here, the 3D content may be a content related to a 3D web-page. In the 3D web-page, an embodiment of a method of increasing visual comfort sensation of a 3D object will be described with reference to FIG. 11.

First Embodiment—Method of Reducing Visual Fatigue on Edge of Screen

A first embodiment of the present disclosure may be implemented with a portion or combination of the components or steps included in the aforementioned embodiments or may be implemented with a combination of the aforementioned embodiments. Hereinafter, overlapping portions may be omitted for clarity of the first embodiment of the present disclosure.

A control method of a terminal according to the first embodiment of the present disclosure may be a method in which when a 3D object included in a 3D content moves in a specific direction on a screen of the terminal and enters (or approaches) an area in which visual fatigue is increased in the entire screen area of the terminal, a rendering scheme of the 3D object is changed, thereby increasing visual comfort sensation.

Generally, in a terminal providing a 3D content, a 3D image or 3D object included in the 3D content may be displayed in a specific area on the screen of the terminal so as to provide visual comfort sensation to a user of the terminal.

For example, the specific area may be a comfort zone.

Figure 3:
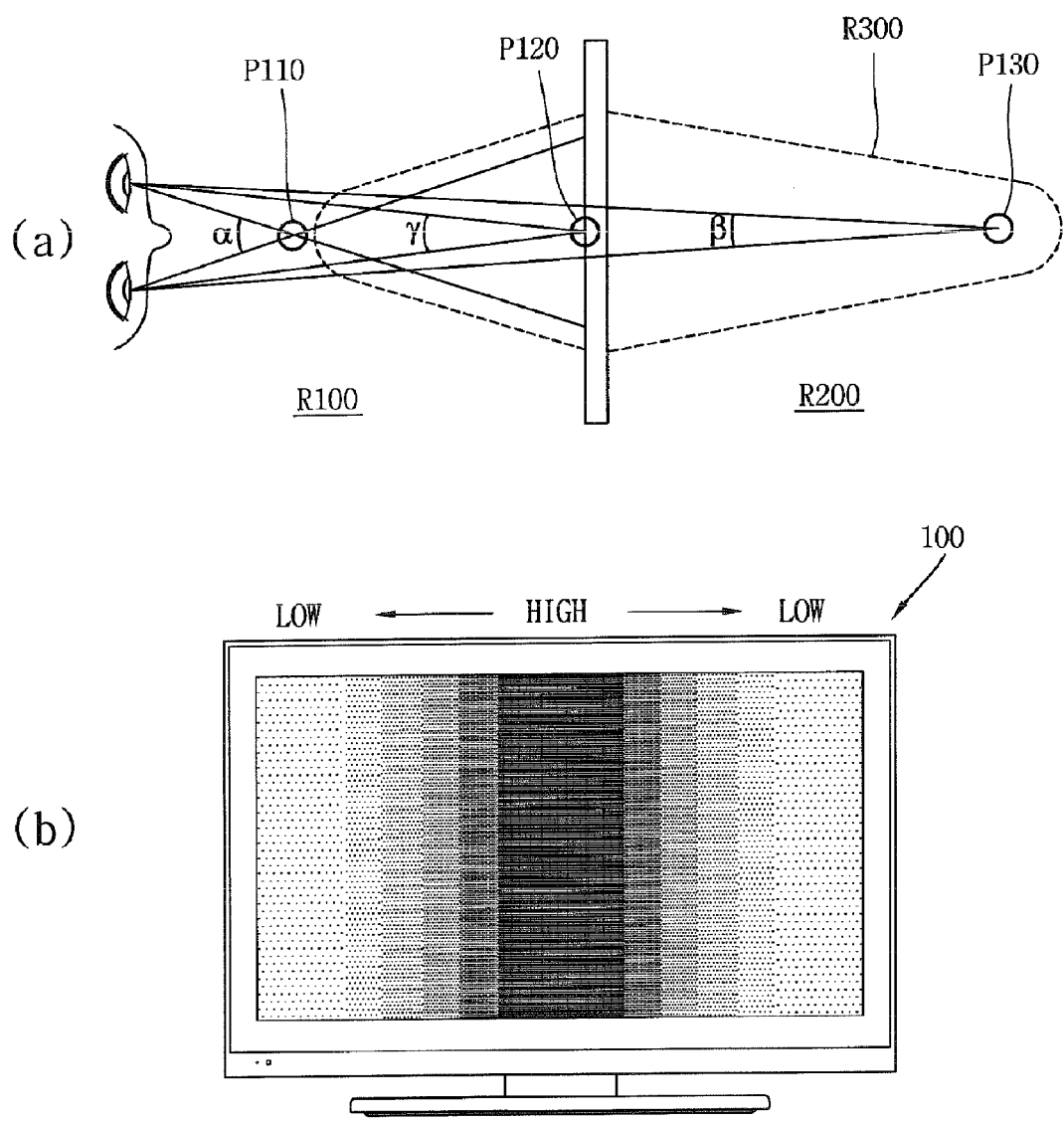
FIG. 3 is an exemplary view illustrating a comfort zone in a control method of a terminal according to a first embodiment of the present disclosure.

FIG. 3 is an exemplary view illustrating a comfort zone in the control method of the terminal according to the first embodiment of the present disclosure.

Referring to FIG. 3(a), a first point p110 indicates the position of a virtual object (or 3D object) existing in a forward area of the screen (or space in front of the screen) R100, a second point p120 indicates a position on the screen, corresponding to the middle between the user's eyes, and a third point p130 indicates the position of the a virtual object existing in a backward area of the screen (or space at the rear of the screen) R200.

Here, the first and third points p110 and p130 may exist at various positions, respectively.

When the 3D object is positioned in a comfort zone R300, the user of the terminal may feel visual comfort or ease sensation when viewing (or recognizing the 3D object displayed on the screen.

Generally, the comfort zone R300 may be determined by the following expression.

$$\alpha-\gamma<1°, \gamma-\beta<1° \qquad \text{Expression 1}$$

Here, a denotes a disparity in the negative parallax, β denotes a disparity in the positive parallax, γ denotes an angle of convergence made by the second point p120 and the user's eyes, and α?γ and γ?β denote disparity angles.

Referring to 3(b), the comfort zone R300 may be positioned in a central area of the screen of the terminal. Therefore, the depth latitude for the 3D object may be high in the central area of the screen, and the depth latitude for the 3D object may be low at the edge on the screen.

According to the control method of the terminal according to the first embodiment of the present disclosure, the rendering scheme of the 3D object is changed based on the position of the 3D object on the screen, so that it is possible to increase visual comfort or ease sensation of the 3D object.

Hereinafter, the control method of the terminal according to the first embodiment of the present disclosure will be described in detail later.

The control method of the terminal providing a 3D content according to the first embodiment of the present disclosure may include displaying the 3D content on a screen of the terminal, changing a rendering scheme of a specific 3D object included in the 3D content when the specific object moves in a specific direction on the screen, and displaying the specific 3D object on the screen using the changed rendering scheme.

According to the first embodiment, the specific direction may be a direction facing an edge on the screen from a previous position of the specific 3D object movement.

According to the first embodiment, the changing of the rendering scheme may performed by changing the image depth of the specific 3D object based on the position of the specific 3D object on the screen.

According to the first embodiment, the image depth may be decreased when the position of the specific 3D object on the screen approaches the edge on the screen.

According to the first embodiment, the changing of the rendering scheme may include determining whether or not the specific 3D object is out of a reference area based on the movement of the specific 3D object and changing the rendering scheme when the specific 3D object is out of the reference area.

Figure 4:
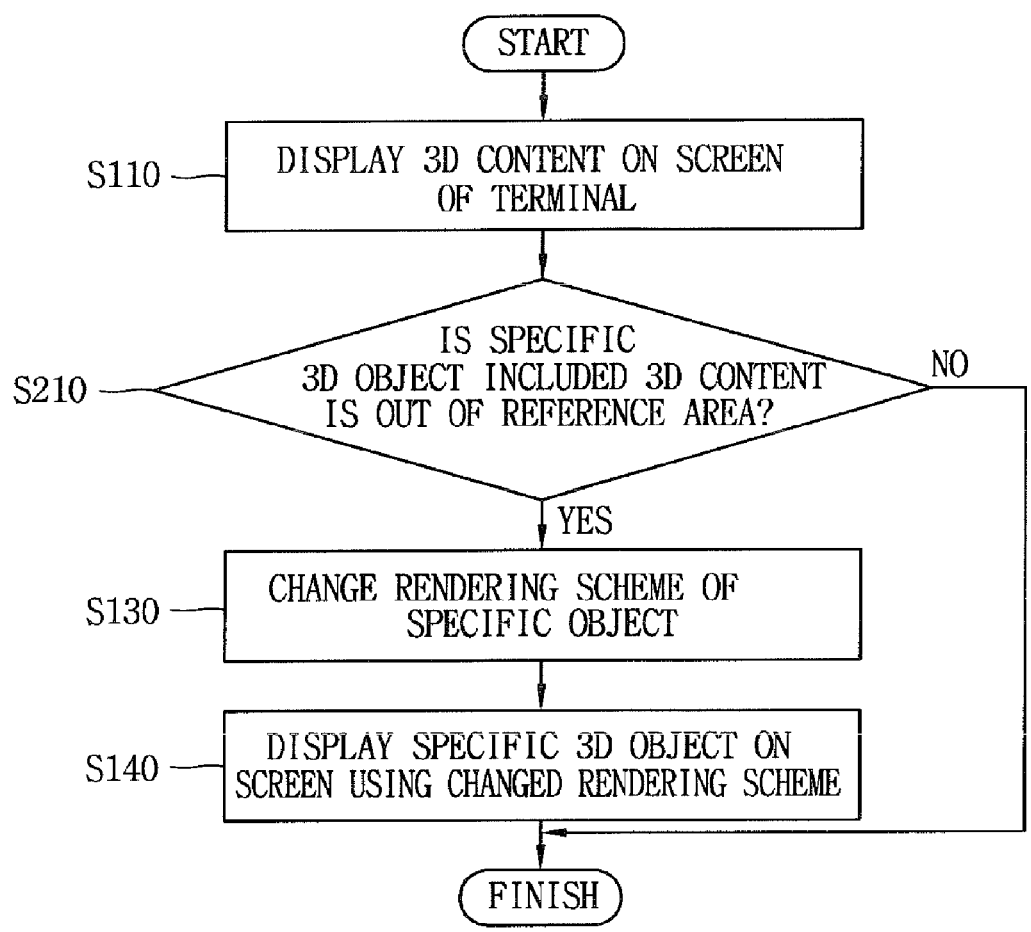
FIG. 4 is a flowchart illustrating the control method of the terminal according to the first embodiment of the present disclosure.

FIG. 4 is a flowchart illustrating the control method of the terminal according to the first embodiment of the present disclosure.

The control method of the terminal according to the first embodiment of the present disclosure may include the following steps.

First, the terminal according to the first embodiment displays a 3D content on a screen thereof (S110).

Next, the terminal determines whether or not a specific 3D object included in the 3D content is out of a reference area (S210).

Next, the terminal changes a rendering scheme of the specific 3D object when the specific 3D object is out of the reference area (S130).

Next, the terminal displays the specific 3D object on the screen using the changed rendering scheme (S140).

When the specific 3D object is not out of the reference area or is displayed on the screen using the changed rendering scheme, the control method of the terminal is finished.

According to the first embodiment, the reference area may be determined based on a degree of visual fatigue of the user of the terminal. In other words, the reference area may be determined based on a degree of visual comfort or ease sensation of the user's 3D object.

For example, the reference area may be the comfort zone R300 described above.

The rendering scheme is a scheme in which a 3D effect is implemented based on first and second images included in the specific 3D object. The image centers of the first and second images may be positioned on the screen by being spaced apart from each other by a distance corresponding to the image depth of the specific 3D object.

The image center of the first image may be closer to the edge on the screen than that of the second image.

Figure 5:
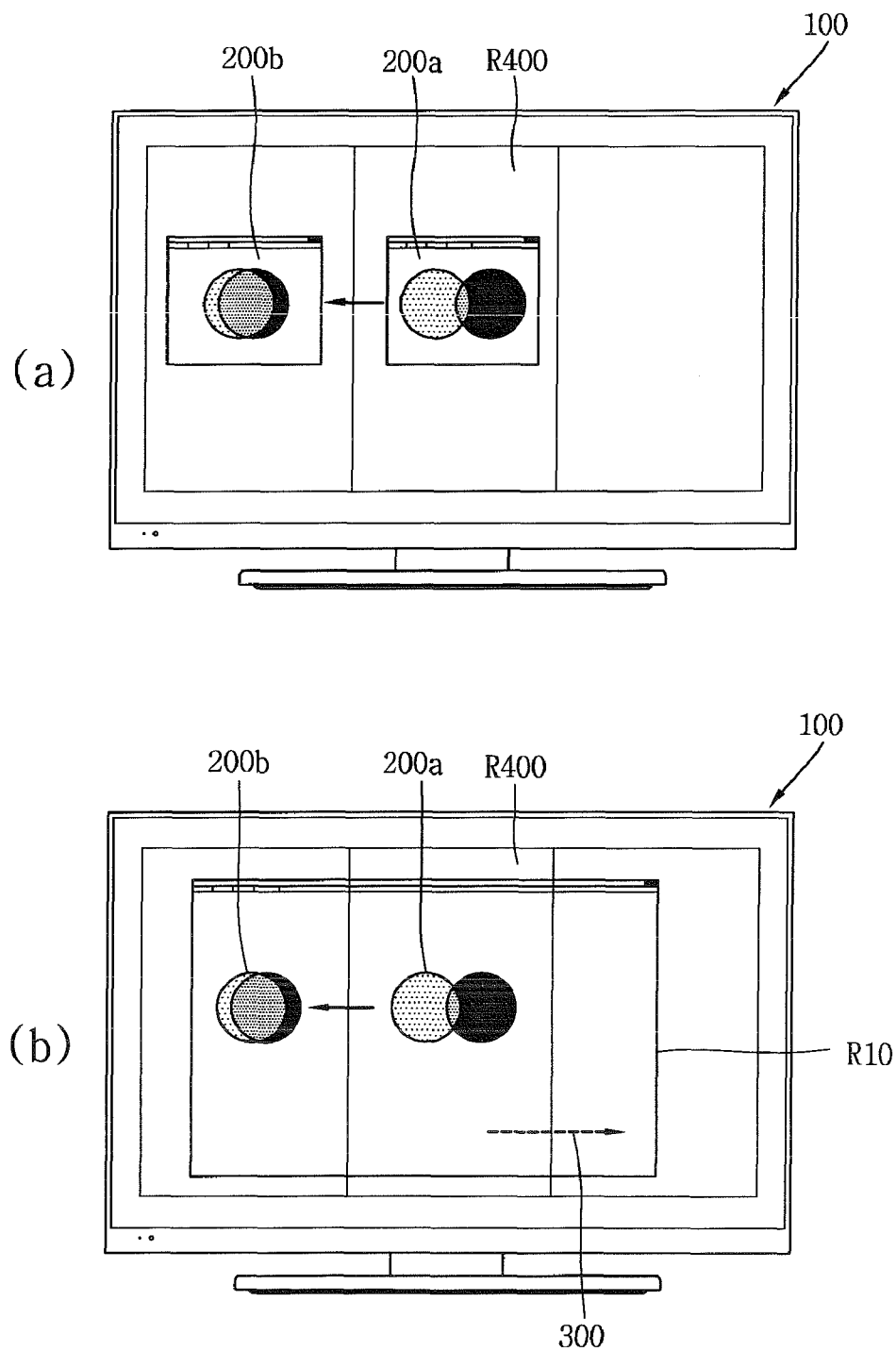
FIG. 5 is an exemplary view illustrating the control method of the terminal according to the first embodiment of the present disclosure.

FIG. 5 is an exemplary view illustrating the control method of the terminal according to the first embodiment of the present disclosure.

Referring to FIG. 5(a), it can be seen that a 3D object 200a positioned in the reference area R400 of the entire area on the screen of the terminal 100.

As described above, the reference area R400 may be determined based on the degree of visual fatigue of the user of the terminal 100. For example, the reference area R400 may be the comfort zone.

According to the first embodiment, when the 3D object 200a is out of the reference area R400, the rendering scheme of the 3D object 200a may be changed.

Here, the rendering scheme is a scheme in which a 3D effect is implemented based on first and second images included in the specific 3D object. The image centers of the first and second images may be positioned on the screen by being spaced apart from each other by a distance corresponding to the image depth of the specific 3D object.

The image center of the first image may be closer to the edge on the screen than that of the second image.

For example, the first and second images may be, respectively, left and right images (or left-eye and right-eye images) corresponding to the specific 3D image.

In FIG. 5(a), it can be seen that the changing of the rendering scheme is performed by decreasing the image depth of the 3D object 200a.

That is, when the 3D object 200a is out of the reference area R400, the terminal 100 may decrease the image depth of the 3D object 200a, and may display a 3D object 200b having the decreased image depth at the position of the moved screen.

In such a manner, the user of the terminal 100 can appreciate or watch a 3D image having visual comfort sensation in an area except the reference area R400.

According to the first embodiment, the 3D object 200a may be moved by various causes. For example, the 3D content displayed on the screen of the terminal 100 is a 3D web-page R10, the 3D object among graphic objects included in the 3D web-page R10 may be out of the reference area R400 by a scrolling operation performed by the user of the terminal 100. In this case, the terminal 100 may decrease the image depth of the 3D object 200a, and may display the 3D object 200b having the decreased image depth at the position of the moved screen.

Second Embodiment—Processing Method when Portion of 3D Object is Out of Screen Zone (1)

A second embodiment of the present disclosure may be implemented with a portion or combination of the components or steps included in the aforementioned embodiments or may be implemented with a combination of the aforementioned embodiments. Hereinafter, overlapping portions may be omitted for clarity of the second embodiment of the present disclosure.

A control method of a terminal according to the second embodiment of the present disclosure may be a method in which a 3D object included in a 3D content moves in a specific direction on a screen of the terminal, and a rendering scheme for the 3D object is changed when a portion of the 3D object is out of an area on the screen of the terminal, thereby increasing visual comfort sensation.

Figure 6:
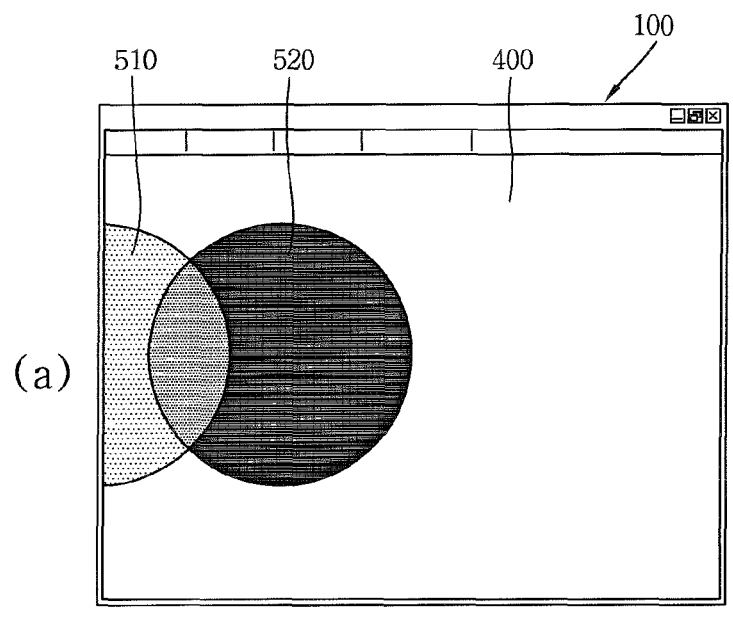
FIG. 6 is a conceptual view illustrating the necessity of a control method of a terminal according to a second embodiment of the present disclosure.
Figure 6:
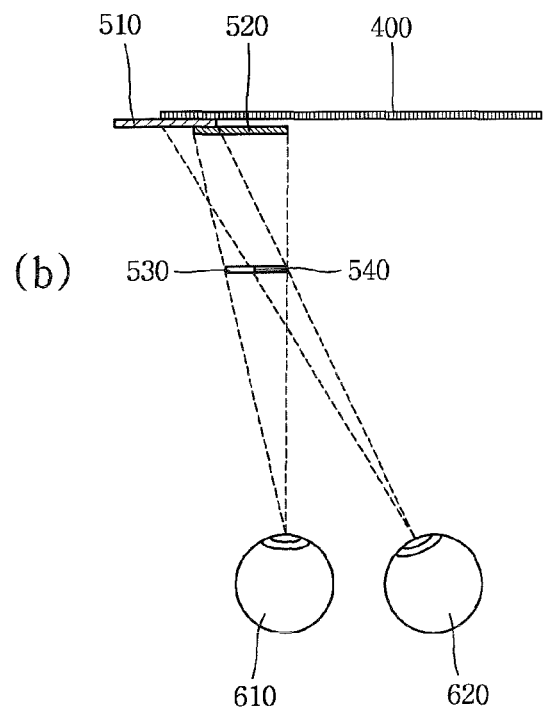

FIG. 6 is a conceptual view illustrating the necessity of the control method of a terminal according to the second embodiment of the present disclosure.

Referring to FIG. 6(a), a 3D object displayed on a screen 400 of the terminal 100 may include first and second images 510 and 520.

The first and second images 510 and 520 are used to generate a 3D effect for the 3D object. The image centers (not shown) of the first and second images 510 and 520 may be positioned on the screen by being spaced apart from each other at a distance corresponding to the image depth of the 3D object.

In this case, there may occur a case in which a portion of the first image 510 is out of the area of the screen 400 due to the movement of the 3D object. On the other hand, the second image 520 may not be out of the area of the screen 400 due to the existence of the image depth of the 3D object.

Referring to FIG. 6(b), the first image 510 may be an image corresponding to the left-eye image, and the second image 520 may be an image corresponding to the right-eye image.

In this case, the feature of the image generated corresponding to the second image 520 may be recognized as the entire image. However, the feature of the image generated corresponding to the first image 510 may be divided into a first feature 530 corresponding to the portion out of the area of the screen 400 and a second feature 540 corresponding to the portion not out of the area of the screen 400.

Therefore, the user of the terminal 100 may feel visual glimmering (or flickering) due to the existence of the first feature 530.

Accordingly, it is important to maintain visual comfort or ease sensation of the 3D object by removing the visual glimmering.

Figure 7:
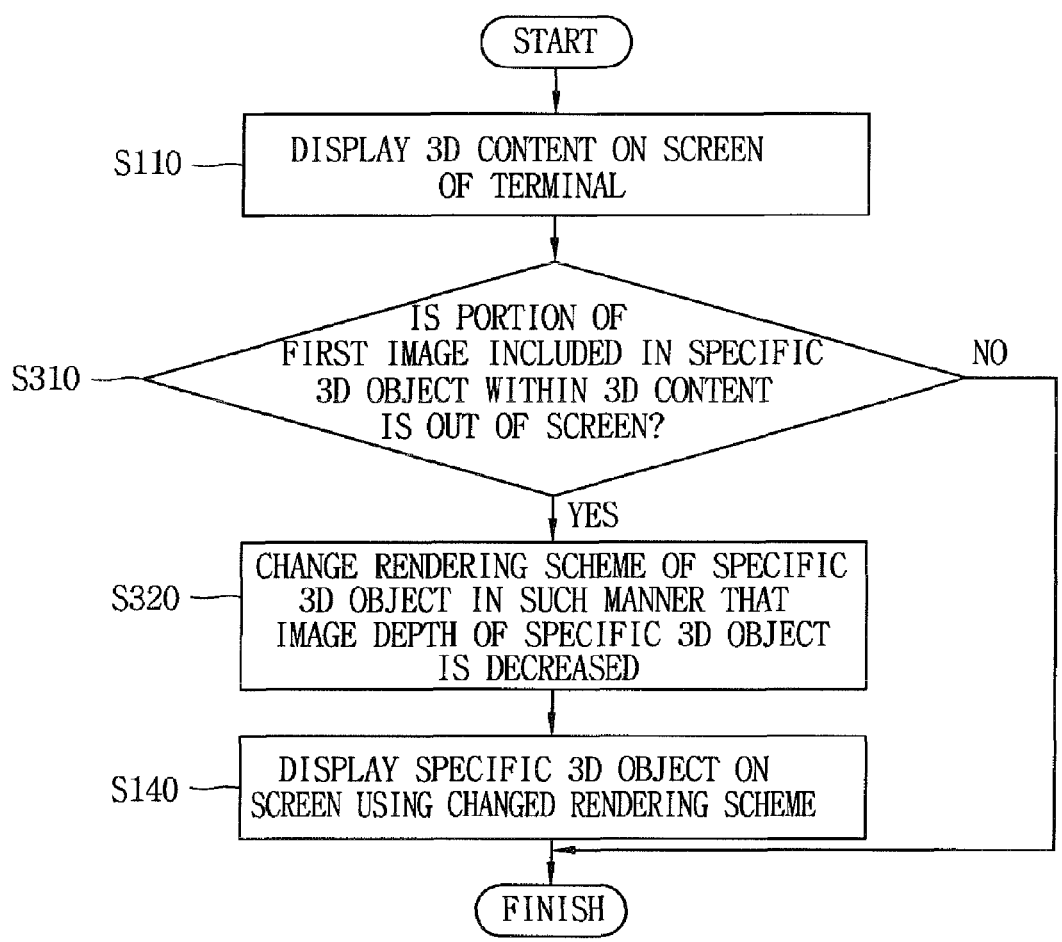
FIG. 7 is a flowchart illustrating the control method of the terminal according to the second embodiment of the present disclosure.

FIG. 7 is a flowchart illustrating the control method of the terminal according to the second embodiment of the present disclosure.

Referring to FIG. 7, the control method of the terminal according to the second embodiment of the present disclosure may include the following steps.

First, the terminal displays a 3D content on a screen thereof (S110).

Next, the terminal determines whether or not a portion of a first image included in a specific 3D object within the 3D content is out of the screen (S310).

Next, when the portion of the first image is out of the screen, the terminal changes a rendering scheme of the specific 3D object in such a manner that the image depth of the specific 3D object is decreased (S320).

Next, the terminal displays the specific 3D object on the screen using the changed rendering scheme (S140).

According to the second embodiment, the changing of the rendering scheme may be performed by decreasing the image depth of the specific 3D object.

According to the second embodiment, the portion of the first image may be positioned on the screen based on the decrease in the image depth.

Figure 8:
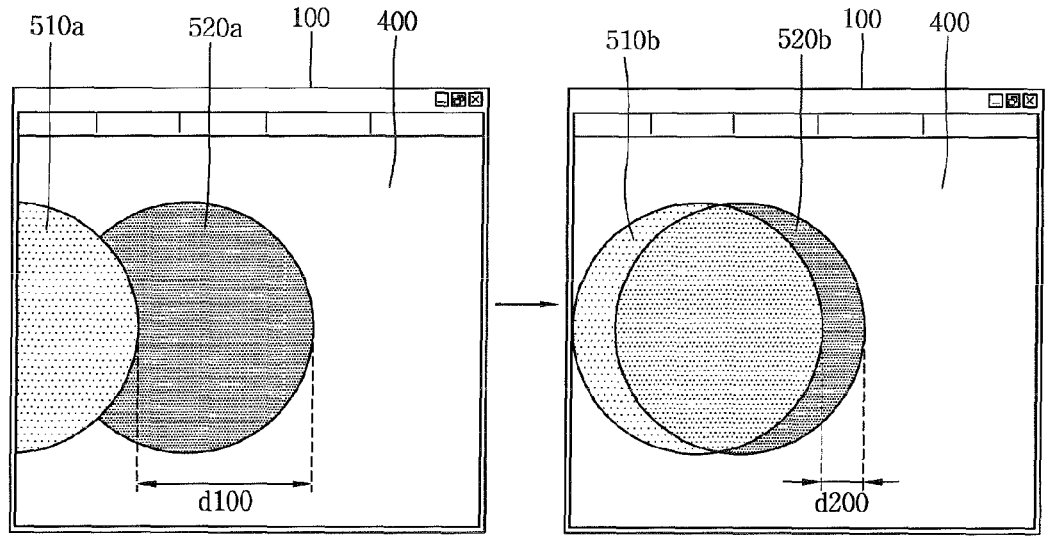
FIG. 8 is an exemplary view illustrating the control method of the terminal according to the second embodiment of the present disclosure.
Figure 8:
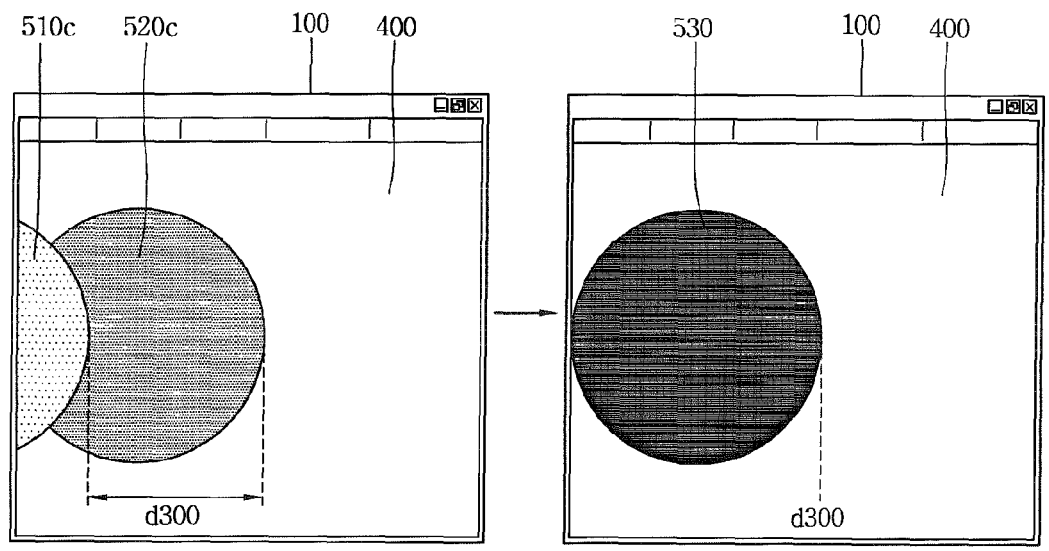

FIG. 8 is an exemplary view illustrating the control method of the terminal according to the second embodiment of the present disclosure.

Referring to FIG. 8(a), a 3D object is displayed on a screen 400 of the terminal 100. The 3D object includes first and second images 510a and 510b.

Generally, as shown in the left drawing of FIG. 8(a), a portion of the first image 510a may be out of the area of the screen 400 due to the movement of the 3D object.

In this case, visual glimmering (or flickering) may occur as described above.

To solve such a problem, the terminal according to the second embodiment may determine whether or not the portion of the first image 510a is out of the area of the screen 400 and decrease the image depth of the 3D object when the portion of the first image 510a is out of the area of the screen 400.

When the image depth of the 3D object is decreased, as shown in the right drawing of FIG. 8(a), the distance between the image centers of the first and second images 510b and 520b may be shortened.

When the distance between the image centers is shortened, the entire of the first image 510b may be positioned within the area of the screen 400, and thus the visual glimmering can be removed.

FIG. 8(b) illustrates a case in which a degree of movement of a 3B object is very large. Like FIG. 8(a), the 3D object includes first and second images 510c and 520c.

When a portion of the first image 510c included in the 3D object is out of the area of the screen 400, the terminal 100, like FIG. 8(a), may decrease the image depth of the 3D object.

However, since the degree of movement of the 3D object is very large, the image depth of the 3D object may be '0' due to the decrease in the image depth of the 3D object, and therefore, the 3D object in which the first and second images 510c and 520c are overlapped with each other may be displayed on the screen 400 (the right drawing of FIG. 8(b)).

Additionally, when a 3D object 530 having the image depth of '0' further moves, a portion of the 3D object 530 may be out of the area of the screen 400. However, since both the first and second images 510c and 520c are out of the area of the screen 400 in the state in which the first and second images 510c and 520c are overlapped with each other, the visual glimmering may not occur.

Third Embodiment—Processing Method when Portion of 3D Object is Out of Screen Zone (2)

A third embodiment of the present disclosure may be implemented with a portion or combination of the components or steps included in the aforementioned embodiments or may be implemented with a combination of the aforementioned embodiments. Hereinafter, overlapping portions may be omitted for clarity of the third embodiment of the present disclosure.

Like the second embodiment, a control method of a terminal according to the third embodiment of the present disclosure.

Figure 9:
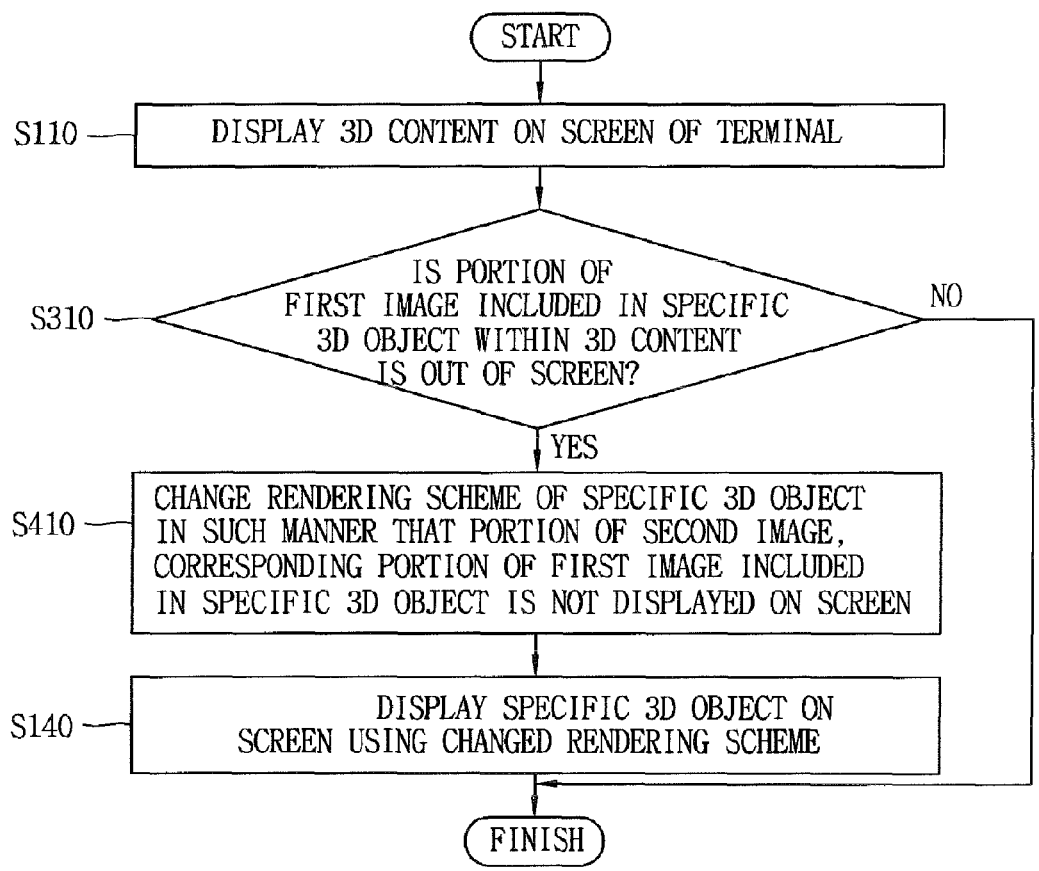
FIG. 9 is a flowchart illustrating a control method of a terminal according to a third embodiment of the present disclosure.

FIG. 9 is a flowchart illustrating the control method of the terminal according to the third embodiment of the present disclosure.

Referring to FIG. 9, the control method of the terminal according to the third embodiment of the present disclosure may include the following steps.

First, the terminal displays a 3D content on a screen thereof (S110).

Next, the terminal determines whether or not a portion of a first image included in a specific 3D object within the 3D content is out of the screen (S310).

Next, the terminal changes a rendering scheme of the specific 3D object in such a manner that a portion of the second image, corresponding to the portion of the first image included in the specific 3D object is not displayed on the screen (S410).

Next, the terminal displays the specific 3D object on the screen using the changed rendering scheme (S140).

Figure 10:
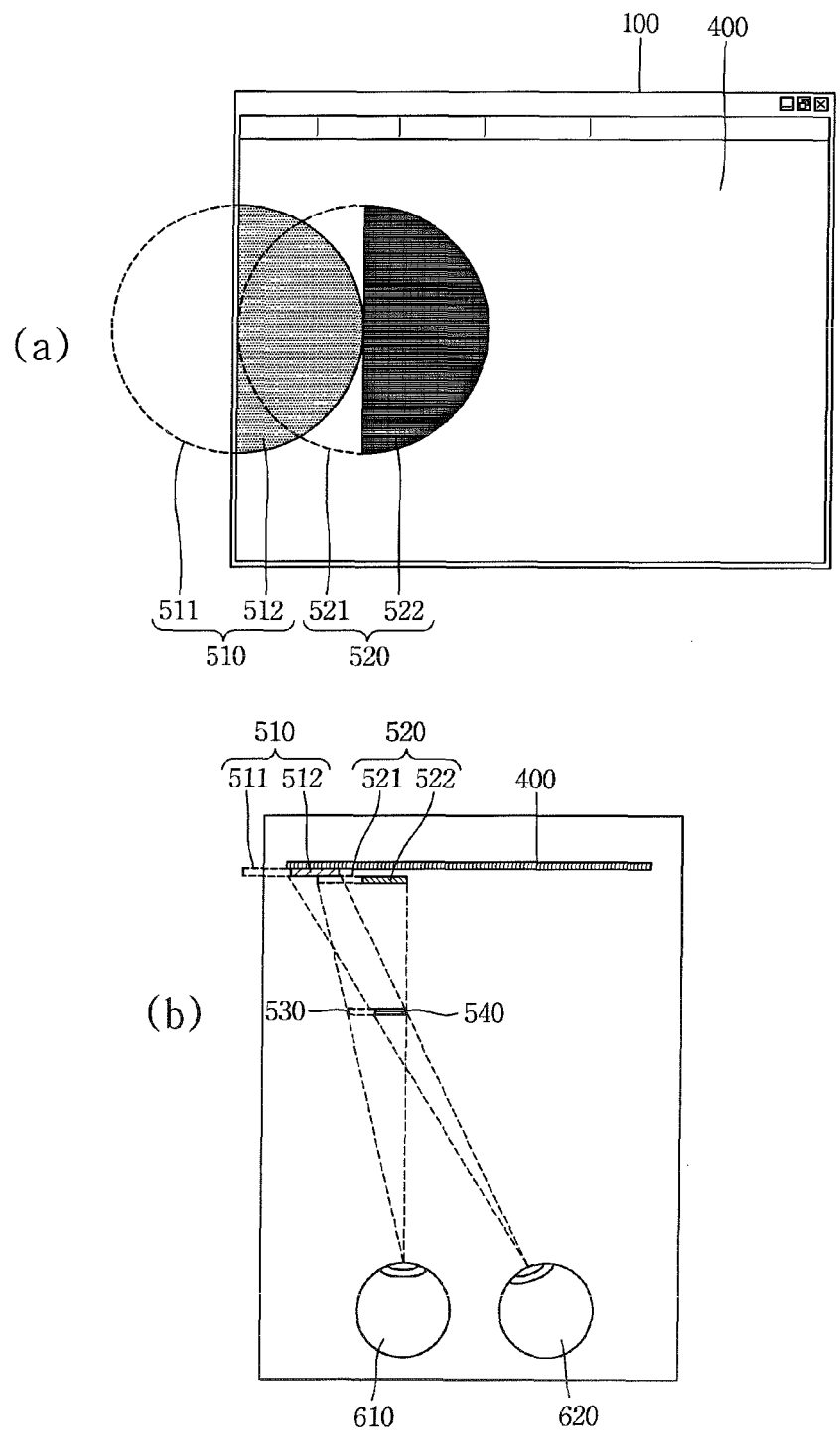
FIG. 10 is an exemplary view illustrating the control method of the terminal according to the third embodiment of the present disclosure.

FIG. 10 is an exemplary view illustrating the control method of the terminal according to the third embodiment of the present disclosure.

Referring to FIG. 10(a), a specific 3D object included in a 3D content includes first and second images 510 and 520.

Because of the movement of the specific 3D object, the first image 510 may be divided into a first portion 511 out of the area of a screen 400 and a second portion not out of the area of the screen 400.

In this case, the terminal 100 may divide the second image 520 into a third portion 521 corresponding to the first portion 511 and a fourth portion 522 corresponding to the second portion 512.

When the first portion 511 out of the area of the screen 400 is generated, the terminal 100 may change a rendering scheme of the 3D object.

The rendering scheme may be changed by not displaying the third portion corresponding to the first portion 511 on the screen 400.

That is, when the first portion 511 is out of the area of the screen 400, the terminal 100 may not display the third portion 521 together with the first portion 511.

FIG. 10(b) illustrates a case in which the third portion 521 is not displayed on the screen 400 when the first portion 511 is out of the area of the screen 400.

In this case, as the feature of an image generated corresponding to the first image 510 is divided into a first feature 530 corresponding to the portion out of the area of the screen 400 and a second feature 540 corresponding to the portion not out of the area of the screen 400, the feature of an image generated corresponding to the second image 520 is divided, and hence visual glimmering can be removed.

Application Fields of Control Method of Terminal According to One Embodiment of the Present Disclosure A control method of a terminal providing a 3D content according to one embodiment of the present disclosure may include displaying the 3D content on a screen of the terminal, changing a rendering scheme of a specific 3D object included in the 3D content when the specific object moves in a specific direction on the screen, and displaying the specific 3D object on the screen using the changed rendering scheme.

The control method of the terminal may be applied to various application fields.

For example, the 3D content provided by the terminal may include game and educational software, etc. as an application field in which software implemented using OpenGL, D3D, etc. is transformed to stereoscopic 3D.

For example, the 3D content provided by the terminal may be applied to stereoscopic 3D flash in flash applications.

For example, the 3D content provided by the terminal may be applied to stereoscopic 3D presentation in applications related to presentation.

Hereinafter, a case in which the 3D content is a 3D web-page in the application fields for the control method of the terminal will be described.

The terms used herein may be construed as meanings of terms generally used in the application fields.

Figure 11:
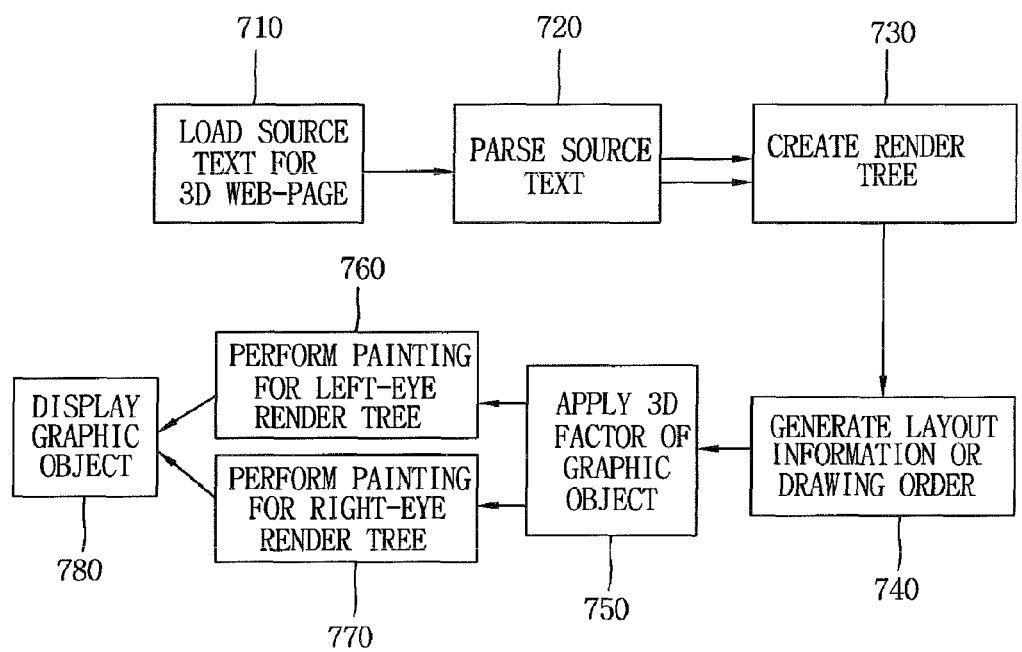
FIG. 11 is a conceptual view illustrating a rendering scheme of a 3D web-page that is a 3D content provided by a terminal.

FIG. 11 is a conceptual view illustrating a rendering scheme of a 3D web-page that is a 3D content provided by a terminal.

Referring to FIG. 11, the rendering scheme of the 3D web-page may include the following order.

First, the terminal loads a source text (or source code) for the 3D web-page (710).

The source text may be implemented using various kinds of programming languages. For example, the source text may be implemented using HTML or CSS.

According to the embodiment of the present disclosure, the source text may include a depth attribute for generating or controlling information on the image depth of a graphic object (or 3D object) included in the 3D web-page for the purpose of rendering of the 3D web-page so that a 3D effect occurs.

Next, the terminal parses the source text (720).

The depth attribute may be stored in style rules for the 3D web-page due to the parsing of the source text, and a DOM tree may be generated.

Next, the terminal creates a render tree based on the DOM tree (730).

Next, the terminal generates layout information or drawing order on various graphic objects included in the 3D web-page based on the render tree (740).

The layout information may be information related to at least one of the position, shape, size and arrangement of the graphic object displayed on a screen of the terminal.

The drawing order may include incorporating a graphic object having the same image depth in one layer, aligning the depth order between these layers in an ascending series, and sequentially drawing the graphic objects in the layer.

The drawing order for the graphic object having the same image depth may be determined in consideration of the z-index of the graphic object, the order in which an element of the graphic object is described in the source text (e.g., HTML), etc.

Next, the terminal applies a 3D factor of the graphic object so as to paint or draw the graphic object (750).

Next, the terminal performs painting (760) for a left-eye render tree and painting (770) for right-eye render tree.

Next, the terminal displays the graphic object based on the painting for the left-eye render tree and the paining for the right-eye render tree (780).

The display scheme may be performed using at least one of a side-by-side scheme, a top-and-bottom scheme and a line-by-line scheme.

In the rendering scheme of the 3D web-page described above, the terminal, the terminal displays the 3D web-page on the screen thereof, changes a rendering scheme of a specific 3D object included in the 3D web-page when the specific 3D object moves in a specific direction on the screen, and displays the specific 3D object on the screen using the changed rendering scheme.

Here, the specific direction may be a direction facing an edge on the screen from a previous position of the specific 3D object movement.

The changing of the rendering scheme may be performed by changing the image depth of the specific 3D object based on a position of the specific 3D object on the screen. The scope of the present disclosure is not limited to the embodiments disclosed in this specification, and it will be understood by those skilled in the art that various changes and modifications can be made thereto within the technical spirit and scope defined by the appended claims.

The invention claimed is:

1. A control method of a display device providing a 3D content, the method comprising:
    displaying the 3D content on a screen of the display device;
    detecting movement of a specific 3D object included in the 3D content, wherein the specific 3D object comprises a first image and a second image, wherein the first and second images correspond to a left-eye image and a right-eye image; and
    changing a rendering scheme of the specific 3D object included in the 3D content when the specific 3D object moves in a predetermined direction on the screen,
    wherein the changing the rendering scheme comprises:
    in response to the detection of the movement of the specific 3D object, determining whether a first portion of one of the first and second images within the 3D content is out of the screen;
    removing the first portion and a second portion corresponding to the first portion of the other one of the first and second images when the first portion is out of the screen; and
    displaying, on the screen, a changed first and second images of the specific 3D object without the first portion and the second portion, and
    wherein the specific 3D object in which the first and second images of the specific 3D object are overlapped with each other is displayed on the screen when a degree of movement of the specific 3D object is larger than a reference range.

2. The method of claim 1, wherein the 3D content is a 3D web-page.

3. The method of claim 1, wherein the predetermined direction is a direction facing an edge on the screen from a previous position of the specific 3D object movement.

4. The method of claim 1, wherein the changing of the rendering scheme is performed by changing an image depth of the specific 3D object based on a position of the specific 3D object on the screen.

5. The method of claim 4, wherein the image depth is decreased when the position of the specific 3D object on the screen approaches an edge on the screen.

6. The method of claim 1, wherein the changing of the rendering scheme comprises: determining whether or not the specific 3D object is out of a reference area based on the movement of the specific 3D object; and changing the rendering scheme when the specific 3D object is out of the reference area.

7. The method of claim 6, wherein the reference area is determined based on a degree of visual fatigue of a user of the terminal.

8. The method of claim 1, wherein the rendering scheme is a scheme in which a 3D effect is implemented based on the first and second images included in the specific 3D object, and image centers of the first and second images are positioned on the screen while being spaced apart from each other at a distance corresponding to an image depth of the specific 3D object.

9. The method of claim 8, wherein the image center of the first image is closer to an edge on the screen than that of the second image.

10. The method of claim 1, wherein the changing of the rendering scheme is performed by decreasing an image depth of the specific 3D object.

11. The method of claim 10, wherein the first portion of the one of the first and second images is positioned on the screen based on the decrease in the image depth.

12. A display device comprising:
    a display configured to display a 3D content on a screen of the display device; and
    a controller configured to:
    detect movement of a specific 3D object included in the 3D content, wherein the specific 3D object comprises a first image and a second image, wherein the first and second images correspond to a left-eye image and a right-eye image, and
    change a rendering scheme of the specific 3D object included in the 3D content when the specific 3D object moves in a predetermined direction on the screen,
    wherein in the changing the rendering scheme, the controller is further configured to:
    in response to detection of the movement of the specific 3D object, determine whether a first portion of one of the first and second images within the 3D content is out of the screen,
    remove the first portion and a second portion corresponding to the first portion of the other one of the first and second images when the first portion is out of the screen, and
    display, on the screen, a changed first and second images of the specific 3D object without the first portion and the second portion, and
    wherein the specific 3D object in which the first and second images of the specific 3D object are overlapped with each other is displayed on the screen when a degree of movement of the specific 3D object is larger than a reference range.

13. The terminal of claim 12, wherein the predetermined direction is a direction facing an edge on the screen from a previous position of the specific 3D object movement.

14. The terminal of claim 12, wherein the rendering scheme is changed by changing an image depth of the specific 3D object based on the position of the specific 3D object on the screen.

15. The terminal of claim 12, wherein the rendering scheme is a scheme in which a 3D effect is implemented based on the first and second images included in the specific 3D object, and image centers of the first and second images are positioned on the screen while being spaced apart from each other at a distance corresponding to an image depth of the specific 3D object.

16. The terminal of claim 12, wherein the rendering scheme is changed by decreasing an image depth of the specific 3D object.

* * * * *